United States Patent [19]
Blinka et al.

[11] Patent Number: 5,993,688
[45] Date of Patent: Nov. 30, 1999

[54] OXYGEN SCAVENGING METAL-LOADED ION-EXCHANGE COMPOSITIONS

[75] Inventors: Thomas Andrew Blinka; Drew Ve Speer, both of Columbia; William Alfred Feehley, Jr., Kingsville, all of Md.

[73] Assignee: W. R. Grace & Co. -Conn., New York, N.Y.

[21] Appl. No.: 09/047,630

[22] Filed: Mar. 25, 1998

Related U.S. Application Data

[60] Division of application No. 08/764,874, Dec. 3, 1996, Pat. No. 5,798,055, which is a continuation-in-part of application No. 08/573,337, Dec. 15, 1995, abandoned.

[51] Int. Cl.⁶ ............... C01B 3/00; A21D 10/02; A21D 4/00; A23L 2/00
[52] U.S. Cl. ............ 252/188.28; 426/118; 426/323; 426/330.5
[58] Field of Search ............... 426/118, 323, 426/330.5; 252/188.28

[56] References Cited

U.S. PATENT DOCUMENTS

| | | | |
|---|---|---|---|
| 4,113,652 | 9/1978 | Yoshikawa et al. | 252/428 |
| 4,192,773 | 3/1980 | Yoshikawa et al. | 252/429 R |
| 4,337,276 | 6/1982 | Nakamura et al. | 426/124 |
| 4,384,972 | 5/1983 | Nakamura et al. | 252/188.21 |
| 4,536,409 | 8/1985 | Farrell et al. | 426/398 |
| 4,702,966 | 10/1987 | Farrell et al. | 428/500 |
| 5,075,362 | 12/1991 | Hofeldt et al. | 524/72 |
| 5,081,097 | 1/1992 | Sharma et al. | 502/417 |
| 5,143,763 | 9/1992 | Yamada et al. | 428/36.2 |
| 5,153,038 | 10/1992 | Koyama et al. | 428/35.8 |
| 5,211,875 | 5/1993 | Speer et al. | |
| 5,284,871 | 2/1994 | Graft . | |
| 5,484,580 | 1/1996 | Sharma | 423/219 |

FOREIGN PATENT DOCUMENTS

| | | |
|---|---|---|
| 0129309 | 12/1984 | European Pat. Off. . |
| 0129310 | 12/1984 | European Pat. Off. . |
| 0153042 | 8/1985 | European Pat. Off. . |
| 0182674 | 5/1986 | European Pat. Off. . |
| 1112025 | 10/1964 | United Kingdom . |
| 2084600 | 2/1981 | United Kingdom . |
| 2084601 | 2/1981 | United Kingdom . |
| 2197634 | 11/1987 | United Kingdom . |
| 9117044 | 11/1991 | WIPO . |

OTHER PUBLICATIONS

Ageless—A New Age In Food Preservation; Mitsubishi Gas Chemical Co. Inc., Tokyo, Japan.

"Activation of Copper Dispersed on a Zeolite for Oxygen Sorption"–Chem. Modif. Surf., 3 (dem. Modif. Oxide Surf.), 65–80.

Copper (II) Ascorbate: A Novel Food Preservation System; Ernest Graf; 1994 American Chemical Society—0021–8561/94/1442–1616304.501.0.

*Primary Examiner*—Cynthia Harris Kelly
*Assistant Examiner*—Monique T. Cole
*Attorney, Agent, or Firm*—Howard J. Troffkin

[57] ABSTRACT

An oxygen scavenging composition composed of a carrier material and a metal-loaded cationic exchange material having the metal in a zero valence state. The composition is contained within the interior cavity of a container to scavenge oxygen therein. The composition may form at least a part of the interior surface of the container or be present therein in the form of a film, mat, sachet or ceramic.

15 Claims, 5 Drawing Sheets

OXYGEN SCAVENGING METAL-LOADED ION-EXCHANGE COMPOSITIONS

This is a division of application Ser. No. 08/764,874, filed Dec. 3, 1996 U.S. Pat. No. 5,798,055, which is a continuation-in-part application of copending application Ser. No. 08/573,337, filed Dec. 15, 1995, abandoned the disclosure of which is incorporated herein by reference to the extent not inconsistent herewith.

BACKGROUND OF THE INVENTION

The present invention relates to polymeric compositions that can be used to retain product quality and improve shelf life of oxygen sensitive materials, and to intermediate shaped structures, e.g., films, coatings, 3-dimensional solids, fibers, webs and the like which contain said composition, as well as to shaped products into or onto which said composition or structure are incorporated or applied to, be part of or attached to the container structure.

The composition is composed of a carrier material combined with an oxygen scavenging metal-loaded ion-exchange material which are each fully described herein. below. Specifically; the composition utilizes an ion-exchange material which has been doped with metal atoms in their zero valence state selected from magnesium, calcium, tin or one of the transition metals from scandium to zinc or mixtures thereof. The present oxygen scavenging composition provides effective absorption of oxygen from the interior of a container without adversely affecting the color, taste or smell of the packaged material contained therein. Further, the resulting composition is thermally stable and does not emit volatile by-products to contaminate the packaged material.

The oxygen scavenging composition has the ability to effectively chemically combine with oxygen in contact therewith, such as from the interior of a container, without undue migration of the oxygen scavenging catalyst out of the matrix. The migration stability of the catalyst is of particular advantage in that it significantly reduces or eliminates adverse effects on the color, taste, or smell of articles in contact with the matrix composition.

In order to enhance preservation, it is standard practice to package food and other materials within laminated packaging material that generally includes a barrier layer, that is, a layer having a low permeability to oxygen. The sheet material can be thin, in which event it is wrapped around the material being packaged, or it can be sufficiently thick that it forms a container body that is provided with a lid or other separate closure. The polymeric sheet material may constitute most or all of the interior exposed surface area of the container.

It is known to include an oxygen scavenger in sheet material. The oxygen scavenger reacts with oxygen that is trapped in the package or that permeates into the package. This is described in, for instance, U.S. Pat. Nos. 4,536,409 and 4,702,966 and the prior art discussed in these references. For instance, U.S. Pat. No. 4,536,409 describes cylindrical containers formed from such sheet material and provided with metal lids.

When the container is formed of a glass or metal body and is provided with a hermetically sealed metal closure, the permeation of oxygen through the body and the closure is theoretically impossible because of the impermeability of the materials from which the body and closure are formed. As a practical matter, metal cans can reliably prevent oxygen ingress. However, some oxygen ingress may occur by diffusion through the gasket or the like positioned between a container body and its lids. It has long been recognized that when conventional containers of these types are used for the storage of oxygen sensitive materials, the shelf life of the stored materials is very limited. The quality of the packaged material tends to deteriorate over time, in part because dissolved oxygen typically is present in the pack from the time it is filled; and in part due to oxygen ingress which occurs during storage.

When the container is in the form of a can, the can end or other closure in many instances includes push components or pull components which are intended to be, respectively, pushed or pulled in order to allow removal of the fluid or other material in the container without removing the entire closure from the container. These push or pull components are often defined by discontinuities or lines of weakness in the panel of the closure. Problems that can arise at these lines of weakness or discontinuities include the risk of permeation of oxygen into the container and the risk of corrosion of the metal where the normal protective lacquer coating is ruptured at the lines of weakness or at the discontinuities.

It would be very desirable to be able to improve the shelf life significantly while continuing to use conventional materials for the formation of the container body, the container closure and, where applicable, the gasket between the body and closure.

Various types of oxygen scavengers have been proposed for this purpose. For example, it is well known to package iron powder in a sachet for use with dry foods. See Mitsubishi Gas Chemical Company, Inc.'s literature titled "Ageless®—A New Age in Food Preservation" (date unknown). However, these materials require the addition of water soluble salts to enhance the oxygen scavenging rate and, in the presence of moisture, the salts and iron tend to migrate into liquids, producing off-flavors. Similarly, U.S. Pat. No. 4,536,409 issued to Farrell et al. recommends potassium sulphite as a scavenger, with similar results. U.S. Pat. No. 5,211,875 issued to Speer et al. discloses the use of unsaturated hydrocarbons for use as oxygen scavengers in packaging films.

It is known in the art that ascorbate compounds (ascorbic acid, its salts, optical isomers, and derivatives thereof) can be oxidized by molecular oxygen, and can thus serve as components of an oxygen scavenging formulation, for example, as a component of a closure compound. For example, U.S. Pat. No. 5,075,362, issued to Hofeldt et al., discloses the use of ascorbates in container closures as oxygen scavengers.

U.S. Pat. No. 5,284,871 issued to Graf relates to the use of an oxygen scavenging composition made of a solution of a reducing agent and dissolved species of copper which are blended into foods, cosmetics and pharmaceuticals. $Cu^{2+}$ ascorbate is used in the examples. The reference teaches that most reducing agents require a transition metal to catalyze oxygen absorption at usable rates (Col. 3, lines 32–38). However, the reference indicates that relatively high level of $Cu^{2+}$ (~5 ppm) are required in the food for scavenging to be effective but indicates that small amounts of $Cu^{2+}$ and oxygen in food will cause food spoilage. In order to avoid spoilage one is required to reduce headspace $O_2$ or partially flush the container with an inert gas (Col. 5, lines 32–39).

A paper by E. Graf, "Copper (II) Ascorbate: A Novel Food Preservation System", Journal of Agricultural Food Chemistry, Vol. 42, pages 1616–1619 (1994) identifies copper gluconate as a preferred raw material.

It is also well known in the scientific literature (See "Polymer Compositions Containing Oxygen Scavenging Compounds", Teumac, F. N.; et al. WO 91/17044, published Nov. 4, 1991, filed on May 1, 1991) that the oxidation rate of ascorbate compounds can be increased significantly by the use of catalysts. Typical oxidation catalysts for ascorbic acid and its derivatives are water soluble transition metal salts. When such catalysts are combined with an ascorbate compound in a polymeric matrix, e.g., a PVC closure formulation, they are effective in catalyzing the oxidation of the ascorbate compound, and increase the oxygen scavenging rate of the ascorbate.

In each.of the above references, the active agents of the oxygen scavenging systems utilize organic materials which would produce by-products (e.g., aldehydes, acids, ketones) of the oxidation process and these by-products tend to adversely effect the packaged material.

Tubular reactors containing copper zeolite powder as particulate filler have been used to remove small quantities of oxygen contained in gas streams under relatively high temperature conditions, such as 140° C. or higher. See "Activation of Copper Dispersed on a Zeolite for Oxygen Absorption" by Sharma and Secham, Chem. Modif. Surf., 3 (Chem Modif Oxide Surf), 65–80. Agents which perform at such elevated temperatures have not been deemed appropriate for use in food or food container applications, as foods are typically maintained at relatively low temperatures and are not exposed to temperatures above 120° C. for any extended time.

It is highly desired to provide an effective oxygen scavenging system suitable for packaging applications which has good oxygen absorption capabilities and which does not provide material which can leach out of the system to adversely effect the color, taste or smell of the packaged material.

It is further desired to provide an effective oxygen scavenging system which has the active scavenger agent contained within a carrier and the agent still provides effective scavenging capacity.

It is further desired to provide an effective oxygen scavenging system which is thermally stable.

SUMMARY OF THE INVENTION

The present invention is directed to an oxygen scavenging composition capable of providing good oxygen absorption capabilities while not adversely affecting the color, taste or smell of material packaged within a container having said composition as a part thereof. The present oxygen scavenging composition is formed of a carrier having therein a metal-loaded cation exchange material in which the metal is substantially in its zero-valence state.

The present invention is-further directed to a shaped structure containing or derived from the subject composition.

DETAILED DESCRIPTION

Figure 1:
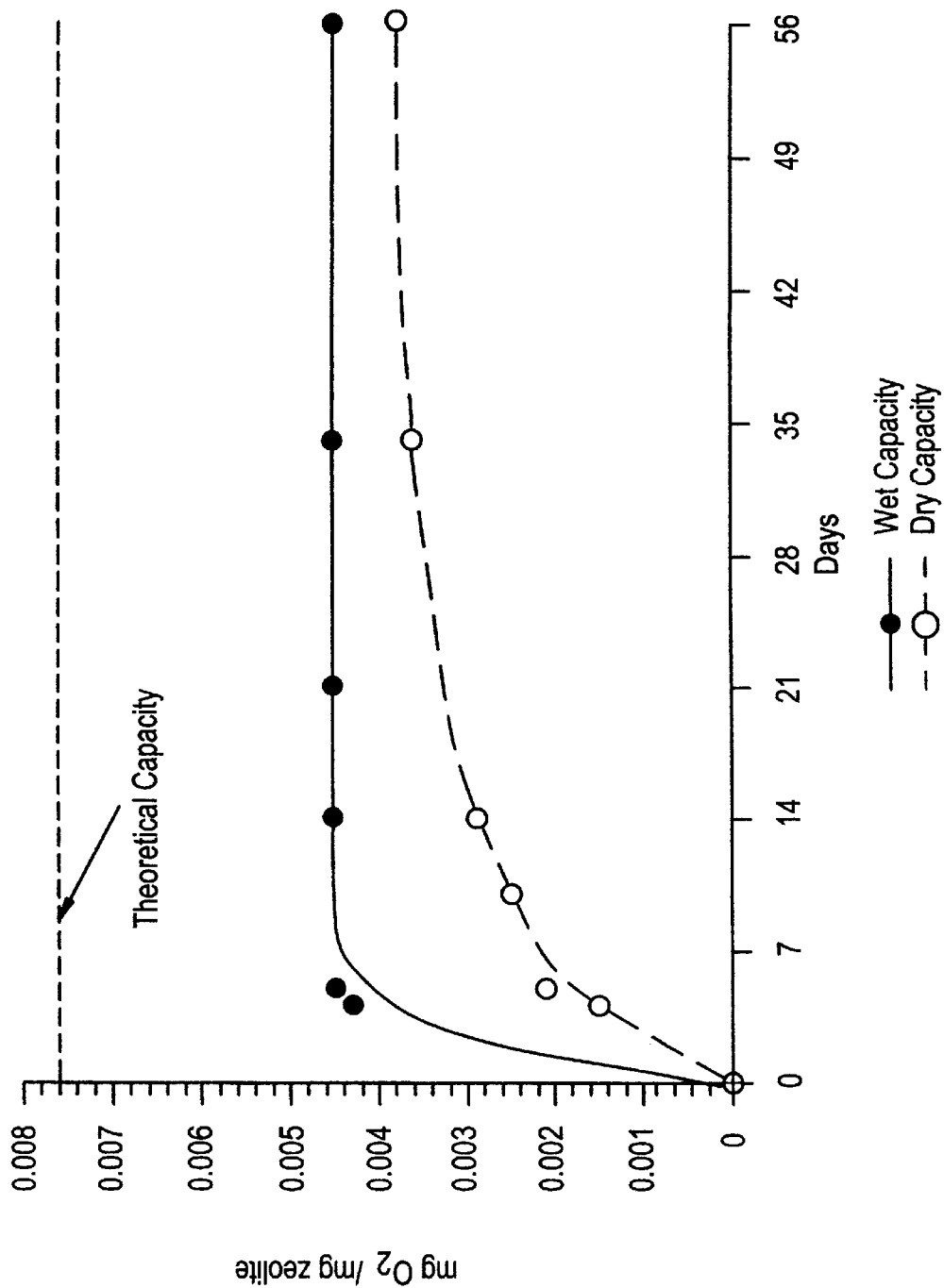
FIG. 1 is a graph of the test results of Example 1, using an inorganic cation exchange material having a copper loading of 3 weight percent.

The present invention is directed to an oxygen scavenging composition formed of a carrier having a metal-loaded cation exchange material in which the loaded metal is substantially in its zero-valence state. The carrier can be a polymer matrix in which the subject metal-loaded cation exchange material is substantially uniformly distributed, or a film or mat (woven or non-woven) having the subject metal-loaded cation exchange material deposited thereon or therein (e.g., within the voids of the mat), or a moisture permeable pouch or sachet which contain the subject metal-loaded cation exchange material, or a porous inorganic matrix having the metal loaded cationic exchange material distributed therein.

The present invention further provides an improved container for packaging materials, such as food, beverages and the like, which are susceptible to oxidative degradation. The present improved container is capable of retaining product quality and enhanced shelf life of the packaged material without adversely effecting the color, taste or smell of the packaged material by the present oxygen scavenging composition.

In one embodiment of the present invention, the carrier of the subject composition comprises a polymeric matrix material, that is to say polymeric material that will form the matrix of the solidified deposit having distributed therein the metal-loaded cation exchange material. The polymeric matrix material will be selected having regard to the nature of the composition (dispersion, latex, plastisol, dry blends, solution or melt) and its utilization as part of the container in a conventional manner.

The polymeric matrix material is chosen from at least one polymeric material that can form a solid, or semi-solid matrix. The polymeric matrix material can be derived from a variety of polymers which are available from a variety of bulk physical configurations such as dispersion, latex, plastisol, dry blend, solution, or melt (e g., thermoplastic meltable polymer). The particular physical configuration of the polymer selected for admixture with the oxygen scavenging composition will depend on the end structure into which the subject composition is eventually formed or incorporated. The polymeric matrix is derived from polymer types which may be thermnoplastic or thermosetting.

The primary function served by the polymer matrix for purposes of the present invention is to serve as a compatible carrier (a material which is stable under normal packaging temperature conditions and does not deactivate the oxygen scavenging ability of the active material) for the oxygen scavenging composition. Consequently, the scope of the polymer in general can be very broad. However, the polymer matrix may also be selected to perform additional functions depending on the physical configuration in which it is provided in a final structure into which it is shaped or incorporated. Thus, the particular polymer or mixture of polymers selected ultimately will be determined by the end use in which it exerts its oxygen scavenging effect.

Accordingly, suitable polymers from which the polymeric matrix may be derived include vinyl polymers, polyethers, polyesters, polyamides, phenol-formaldehyde condensation polymers, polysiloxanes, ionic polymers, polyurethanes, and naturally occurring polymers such as cellulosics, tannins, polysaccharides, and starches.

Suitable materials for use as the polymeric matrix component of latex compositions, e.g., for can ends, are described in U.S. Pat. No. 4,360,120; U.S. Pat. No. 4,368,828 and EP 0182674. Suitable polymeric materials for use when the compositions are organic solutions or aqueous dispersions are described in U.S. Pat. No. 4,360,120; U.S. Pat. No. 4,368,828; and GB 2,084,601. Suitable materials for use in thermoplastic compositions include the materials proposed in U.S. Pat. No. 4,619,848; U.S. Pat. No. 4,529,740; U.S. Pat. No. 5,014,447; U.S. Pat. No. 4,698,469; GB 1,112,023; GB 1,112,024; GB 1,112,025 and EP 129309. The teachings of each of the references cited herein are incorporated herein by reference.

In particular, the polymeric material can be generally selected from polyolefins as, for example, polyethylene, polypropylene, ethylene/propylene copolymers, acid modified ethylene/propylene copolymers, polybutadiene, butyl rubber, styrene/butadiene rubber, carboxylated styrene/butadiene, polyisoprene, styrene/isoprene/styrene block copolymers, styrene/butadiene/styrene block copolymers, styrenelethylene/butylene/styrene block copolymers, ethylene/vinyl acetate copolymers, ethylene/acrylate and ethylene/(meth) acrylate copolymers (for instance, ethylene/butyl acrylate or ethylene/butyl methacrylate copolymers), ethylene/vinyl alcohol copolymers, vinyl chloride homopolymers and copolymers, styrene/acrylic polymers, polyamides, and vinyl acetate polymers, and blends of one or more of these. Polyethylenes found useful in forming the subject composition include high density polyethylene (HDPE), low density polyethylene (LDPE), linear low density polyethylene (LLDPE), ultra-low density polyethylene (ULDPE) and the like as well as copolymers formed from ethylene with one or more other lower alkenes (e.g., octene) and the like.

In this embodiment, particularly preferred compositions according to the invention are thermoplastic compositions formed of polyethylene or copolymers of polyethylene such as, for example, ethylene/vinyl acetate and the like or polyethylene blends such as, for example blends of HDPE and butyl rubber; polyethylene and ethylene/vinyl acetate copolymer; as well as polyethylene and styrene/butadiene/styrene block polymer and the like. The polyethylene, if used, is preferably a low density polyethylene, and may be a very low or ultra low density polyethylene which may be branched or linear. The ethylene/vinyl acetate copolymer, if used, preferably has a melt index in the range 3 to 15, preferably 5 to 10, and generally contains 5 to 40%, preferably 5 to 30%, vinyl acetate.

Further, a plastisol or a dry blend of polymer may be used in combination with a plasticizer for forming the polymer matrix. Suitable materials for use when the compositions are plastisols include vinyl chloride homopolymers and copolymers.

Instead of preparing such compositions as true plastisols, they may be provided as dry blends of the polymer and plasticizer. The proportion of plasticizer present in a vinyl resin plastisol may be any conventional proportion, typically from 30 to 150 weight parts of plasticizer per hundred weight parts of vinyl resin.

The polymeric matrix of the composition may further contain conventional plasticizers, including phthalates, adipates, glycols, citrates and epoxidized oils and the like. Examples include for example dioctyl phthalate, diisooctyl phthalate or diisodecyl phthalate, which are readily available. Other usable plasticizers are butyl benzyl phthalate, acetyl tributyl citrate, ethyl diphenyl phosphate and diisobutyl phthalate. One particularly useful combination of plasticizers for use with a vinyl chloride/vinyl acetate copolymer resin is a mixture of diisodecyl phthalate and diisooctyl phthalate in a weight ratio of about 7–8:1.

The polymeric matrix of the subject compositions may contain filler, slip aids, process aids, pigments, stabilizers, anti-oxidants, tackifying resins, foaming agents and other conventional additives in conventional amounts, depending upon the nature of the composition and its final use. If the composition is a thermoplastic composition the total amount of such additives is generally below 10%, most preferably below 3%, based on the total weight of the composition but when the composition is a plastisol, dispersion, organic solution or latex, the amounts of additives based on polymeric material may be higher. For instance, a large amount of filler may be incorporated. When an anti-oxidant is incorporated, it should be present in amounts capable of stabilizing the polymeric composition against degradation due to free-radicals formed during processing. However, the amount of anti-oxidant should be small enough to permit the oxygen scavenger component of the composition to effectively react with molecular oxygen. The specific amount will depend on the anti-oxidant used and can be determined by minor experimentation.

The composition of the invention may be formulated in any convenient form, such as a melt, plastisol, organic solution, dry blend, latex or dispersion. The main ingredients of the composition, apart from the oxygen scavenger, are normally typical of those conventionally present for the intended purpose. It is preferred that the total composition should be non-aqueous (i.e., an anhydrous solution, plastisol or thermoplastic melt) so as to prevent initiation of the reaction of the scavenger within the composition. Alternatively, the scavenger may be encapsulated or in some other way prevented from contacting water used in forming the subject composition.

The polymer matrix of the subject composition may be selected from those used to form coatings on at least a portion of the interior surface of a package (e.g., a rigid container such as a can, can lid, box or the like). The polymer matrix can be selected from polymer classes commonly referred to as epoxides, phenolics (e.g., phenol-formaldehyde condensation polymer), lacquers (e.g., cellulose esters or ethers, shellac, alkyl resins and the like), polyurethanes and the like.

The present composition is particularly suitable for use with carrier materials conventionally used to coat the inner surface of containers (e.g., cans) in which the coating requires application of heat to drive off solvent and/or to cure the carrier material. For example, lacquers, epoxy resins and the like may be coated on the inside of metal can surfaces as a protective coating. To cure the coating, the treated can is subjected to elevated temperatures for short periods of time to remove solvent and cure the coating prior to filling and sealing the can. Conventional oxygen scavengers composed of oxidizable organic compounds are not suitable as part of such curable coating material as they are known to degrade under elevated temperatures normally required for such curing steps. The present composition is particularly suitable for such application as the scavenger is stable at the high curing temperatures. For example, the carrier can be a polymer matrix formed of an organic lacquer such as composed of a cellulosic ether or ester, alkyl resin or mixtures thereof in a solvent such as, for example, an alcohol (e.g., $C_1$–$C_3$ alkyl alcohol), a ketone (e.g., methyl ethyl ketone), an acetate (e.g., butyl acetate) or an aromatic (e.g., toluene, xylene) or mixtures thereof. The metal-loaded zeolite or other cation exchange material of the subject invention which is stable (does not degrade or lose oxygen-scavenging activity when subjected to the elevated temperatures contemplated for curing process) can be used as the oxygen scavenger component.

In a second embodiment, the subject composition utilizes a film or fibrous mat (woven or non-woven) which carries the present oxygen scavenger described herein below. The carrier can be formed from a polymeric material, such as those described herein above, capable of forming a film and upon the surface thereof is deposited the present oxygen scavenger. The surface of the film can be coated with the subject oxygen scavenger by forming a suspension or dispersion of the oxygen scavenger powder in a polymer and depositing the suspension or dispersion by a conventional means, such as spraying or knife coating application or the like, directly onto the surface of the carrier film. The particular nature of the carrier film will depend upon the application of its used and the ability of the carrier formed to have the oxygen scavenger adhered to its surface and substantially retain its integrity during use.

The carrier can, alternately, be in the form of a fibrous (woven or non-woven) mat. The oxygen scavenger is contained in the interstices of the mat structure. The fibers forming the mat may be formed from any suitable material or synthetic fiber such as cotton, glass, nylon, polyethylene, and copolymers of ethylene with one or more ethylenically unsaturated monomer, polypropylene and copolymers of propylene with one or more ethylenically unsaturated monomer and the like. The particular nature of the carrier mat will depend upon the application of its use and the ability of the mat to retain oxygen scavenger material within the interstices of the mat structure during use. The scavenger can be deposited into the mat structure by any means such as by dipping the mat into a dispersion or suspension of the scavenger and then removing the liquid from the mat.

In a third embodiment, the subject oxygen scavenger described herein below can be retained within a carrier in the form of a pouch or sachet of suitable size to be inserted in a container having an oxygen sensitive material therein. The pouch or sachet should be sufficiently porous to permit moisture and oxygen to penetrate through the pouch or sachet forming material at ambient temperature conditions. The subject oxygen scavenger material is preferably in particulate form which is a sufficient particulate size to permit the sachet structure (e.g., pore size diameter, pore structure) to retain the oxygen scavenger therein. The pouch or sachet can be formed from natural or synthetic materials such as paper, cotton cloth, polymer films and the like in manners well known to the packaging technology.

A fourth embodiment is to utilize a carrier in the form of a porous inorganic material, such as a ceramic having the oxygen scavenger described herein below distributed therein. The ceramic can be formed into any desired shape (e.g., spheres, cubes, and the like) and size which is suitable for insertion into the container having the oxygen sensitive material. Useful ceramics include clays such as those having kaolinite, montmorillonite or illite along with diaspore, gibbsite and bauxite. Ceramics further include silicas such as quartz, tridymite, cristabalite, diatomite and the like.

An essential feature of the invention is that the subject composition contains an oxygen scavenger, that is to say an agent that can react with gaseous oxygen. The oxygen scavenger is preferably a reducing agent that reacts with gaseous oxygen in an ionic reaction that takes place in the presence of moisture.

It has been found that metal-loaded cation exchange materials having a metal in its zero-valence state as part of the exchange material configuration, while in a carrier, can be used as oxygen scavenger compositions The finely powdered cation exchange materials include, for example, inorganic alumino silicates and the like. The resultant composition can be used for the preservation of oxygen sensitive foods stored at ambient conditions. These compositions have an advantage over those containing organic oxygen scavengers (such as ascorbates and unsaturated hydrocarbons) because they do not produce organic oxidation by-products which may contaminate the food material. Still further, water-soluble salts normally used in conjunction with oxygen scavengers to increase the scavenging rate are not required. Further, the present compositions exhibit minimal migration of metal ion into aqueous solutions. It is, therefore, been found by the present invention, an oxygen scavenger composition which does not cause discoloration or detract from taste of the packaged food product.

The oxygen scavenger of the present invention is a cation exchange material that has been loaded with a substantially zero-valent metal. It has been found that the nature of the system is such that the metal is supported by the cation-exchange material in a manner which causes the metal to be highly reactive with molecular oxygen. The scavenging activity is initiated by the presence of moisture and provides effective scavenging at ambient conditions. A preferred exchange material is a class of materials known as inorganic zeolites. These materials are generally hydrated alumina silicates having sodium and/or calcium. These materials may be either natural or synthetically formed. For the purpose of this patent, a zeolite is an aluminosilicate with a framework structure enclosing cavities capable of being occupied by large ions and water molecules, both of which have considerable freedom of movement, permitting ion exchange and reversible dehydration. A typical naturally occurring zeolite is the mineral faujasite with formula $Na_{13}Ca_{11}Mg_9K_2Al_{55}Si_{137}O_{384} \cdot 235H_2O$. Ammonium and alkyammonium cations may be incorporated in synthetic zeolites, e.g., $NH_4$, $CH_3NH_3$, $(CH_3)_2NH_2$, $(CH_3)_3NH$, and $(CH_3)_4N$. Zeolites A, X, Y, ZK-5, faujasite, and laulingite have frameworks consisting of linked truncated octahedra (beta-cages) characteristic of the structure of sodalite. Some of the synthetic zeolites are structurally related to minerals and are included in this classification; however, for most of the synthetic zeolites the structures are not known. Numerous synthetic zeolites are also available, and are preferred for the purpose of this invention.

To prepare the scavenger of this invention, the zeolite or other exchange material is ion exchanged with a solution of the desired metal salt. The metal ions are believed to become bound by the zeolite. They are chemically reduced to their zero valence state by any suitable means. One method of accomplishing the reduction is to subject the loaded material to hydrogen gas under high pressure and elevated temperatures. The resultant scavenger is then dried and is ready for incorporation into the carrier.

Any metal that can be reduced substantially to the zero-valent state, and where that state is capable of reacting with molecular oxygen, is suitable for this invention. In practice, metals are selected that do not react with oxygen too quickly, as this would render the scavenger too difficult to handle. Furthermore, from a standpoint of food safety, metals of low toxicity are preferred. In general it is preferred to utilize a reduced metal of zero valence selected from calcium, magnesium, scandium, titanium, vanadium, chromium, manganese, iron, cobalt, nickel, copper, zinc or tin. The preferred metals are the transition metals of the Periodic Table forming the series from scandium to zinc (i.e., Sc, Ti, V, Cr, Mn, Fe, Co, Ni, Cu and Zn) with iron and copper being more preferred. Copper is especially preferred for use with this invention.

The metal-loaded cation exchange material is a finely divided solid that is particularly suited to replace part or all of the filler commonly found in sealant compositions which is an application contemplated herein. As mentioned, the composition as a whole is preferably anhydrous. Thus, it is preferred that, where used, the polymeric matrix is also preferably anhydrous. Generally, the polymeric matrix substantially protects the scavenger from moisture under normal atmospheric conditions and, therefore the scavenger remains substantially inert to scavenging activity until high degrees of moisture are present. The polymer matrix should be sufficiently porous to permit moisture to pass into the formed composition.

A preferred aspect of the invention is that the scavenger should remain substantially inert in the composition and in the gasket or other solid deposit formed with the subject composition until the composition is on or in a sealed container. Exposure of the composition to high humidity that normally exists within a sealed container will, therefore, result in sufficient permeation of moisture into the composition and the subject oxygen scavenger to initiate a satisfactory degree of scavenging and result in improved shelf life of the packaged material. However, the scavenging reaction can be accelerated by heating the composition sufficiently while in the closed container to cause increased permeation of moisture. Thus, preferably the scavenger is a material that remains substantially inert in the carrier until the scavenging reaction is accelerated by heating in the presence of moisture.

Preferably the scavenging reaction of the present composition is accelerated by pasteurizing (typically at 50°–100° C.) or sterilizing (typically at 100°–150° C.) container after filling it with an aqueous fill and sealing it. This triggering appears to be a consequence of the composition, when heated, permitting moisture to permeate into the composition and the subject scavenger. The moisture becomes trapped in the composition, thereby bringing the scavenger into contact with sufficient water to permit reaction with oxygen. This oxygen may permeate through the composition either from oxygen trapped within the container when it was filled or which subsequently enters the container from the surrounding atmosphere.

It may be desirable to include in the composition a material, for instance a surfactant such as sodium dodecylbenzene sulphonate, which will increase the permeability of the composition to water and a suitable amount of a surfactant such as this is between 0.1 and 1.0% by weight.

The amount of the scavenger is dependent on the type of application. When the scavenger is incorporated into a gasket, the amount is normally at least 0.5 weight percent based on the polymeric matrix material, generally at least 1% and preferably at least 2%. It is generally unnecessary for the amount to be above 20% and 4%–10% is often a convenient maximum. Expressed in an alternative manner, the amount of scavenger is typically in the range 0.01 to 2 g, often 0.02 to 0.1 g, per container.

In the case of a plastisol, lacquer, or hotmelt applied to the center panel of a closure, where the matrix does not otherwise serve as a gasket, scavenger loadings can be much higher. For example, loadings of 20 weight percent to 60%, or in some cases up to 90% are workable.

When the composition is in the form of a film, mat, pouch or sachet, the oxygen scavenger should be present in an amount to effectively scavenge oxygen during the contemplated storage period of the container for the appropriate contents.

The amount is normally in the range of from 0.01 to 2 grams per container of normal size.

By the invention it is possible to greatly prolong the shelf life of an oxygen sensitive food or other content of the sealed container by reducing the degree of oxygen degradation.

The present composition can be used as part of a package container which can provide storage stability to the material packaged therein without detracting from the material's taste, odor or smell. The present composition should be exposed to the inner atmosphere of the resultant sealed container in any form such as a coating on all or a parft of the inner surface of the container body or closure means (e.g., lid, can end) or as an insert in the form of a film, mat, pouch, sachet or ceramic structure.

The invention formed with a polymer matrix or film can be applied as a center panel lining on a container closure. The closure can be a cap, can end, lid stock or film. The invention also includes container closures carrying a solid deposit formed on the closure from a polymer matrix or film composition and that is positioned to seal around, or over a line of weakness in, the closure. The solid deposit can be a gasket deposited around the closure and formed from the composition. Instead of, or in addition to the deposit being such a gasket, the composition can be deposited on the inner face of a closure at a position where there is a discontinuity or line of weakness around a push or pull component for opening a container sealed by the closure. The closure occupies, as is conventional, only a minor part of the exposed surface area of the closed container, often less than 25% of the surface area. Thus, the area of the solid deposit can be very small relative to the area of the container. Despite this, the invention can give greatly improved storage stability to the contents.

The invention also includes filled containers sealed with such closures. The sealed container comprises a container body, the closure fitted on it, and the filling that is contained within the container body. The container body is preferably of glass or metal. The closure is preferably of metal.

The filling can be any beverage, foodstuff or other material that is to be stored within the container but the invention is of particular value when the filling is a material whose shelf-life or product quality is normally restricted due to oxygen ingress or contamination during storage. The container body can be a can, generally of metal, in which event the closure is a can end. Generally the entire closure is of metal or polymeric material but the panel of the closure can include a removable component of either metal or polymeric material.

Instead of a can body, the container body can be a bottle or jar in which event the closure is a cap. The bottle or jar is preferably of glass but it can be of polymeric material with very low oxygen permeability. The cap can be of polymeric material, for instance a polypropylene, that may include a barrier layer. Generally, the cap is formed of metal and may include a push or pull component of metal or polymeric material. The cap may be a crown cap such as a pry-off or twist-off crown, a twist-on cap, lug cap, press-on/twist-off, or press-on/pry-off cap, a screw-on cap, roll-on metal cap, continuous thread cap, or any other conventional form of metal cap or polymeric cap suitable for closing the bottle or jar.

A gasket is normally provided between the container body and the closure. This gasket can be used to carry the composition of the invention (in particular, as a polymer matrix containing composition) either as a blend in the gasket composition or as a separate component applied on or near the gasket but it is possible for the composition of the invention to be utilized elsewhere on the closure or elsewhere in the container. In that event the gasket-forming composition can be any unaltered conventional composition suitable for forming the gasket.

When the closure is a cap, the subject scavenger composition may form an overall gasket or a portion of an overall gasket. This is typically true for small diameter caps such as those less than 50 mm in diameter. For large diameter caps, the gasket is a ringlike gasket and may be deposited in a conventional manner from the gasket-forming composition. For instance, a ringlike gasket can be formed on a cap by being applied in liquid form as a ring and can then be converted to solid form by drying, heating to cure or cooling to set a thermoplastic, as appropriate. The oxygen scavenging composition could be blended into the gasket material, deposited on the gasket material, or applied to an area of the cap not covered by the gasket (the center panel). The gasket-forming composition may, for this purpose, be a dispersion, latex, plastisol, dry-blend, suitable thermoplastic composition or organic solution. The cap, carrying the gasket, is then pressed on to an appropriate sealing face around the open end of the filled container body and closed in conventional manner.

If the composition is formed with a thermoplastic polymer matrix, it may be applied as a low viscosity melt while the cap is spinning, so as to throw the composition into the form of a ring, or it may be applied as a melt which is then molded into the desired shape, often a disc having a thickened ring-like portion. Further, the gasket can be in the form of a pre-formed ring or disc which is retained (e.g., by mechanical or adhesive means) within the cap.

If the closure is a can end, the oxygen scavenging material is typically not used in the gasket composition because, under typical can seaming conditions, the gasket is not substantially exposed to oxygen in the pack. Also, the seams are not particularly vulnerable to oxygen ingress. The oxygen scavenging material is typically applied on a center panel or other interior surface in the can, such as applied as a coating of a can.

It is particularly preferred that the gasket or coating on the container closure be formed by applying the fluid or molten composition of the present invention formed with a polymer matrix and solidifying it on the closure. The method of application and solidification is generally conventional. It is particularly preferred that the container and can end should both be of metal or the container body should be of glass and the closure of metal or plastic, since the use of the defined compositions for forming the gasket then appears to give particularly beneficial results. In particular, excellent results are achievable when the container body is a glass bottle and the closure is a metal cap.

Instead of or in addition to using the fluid or meltable polymer matrix composition of the invention for forming a gasket, it is possible to deposit the composition elsewhere on the inner face of the closure. It may be applied as an overall coating of the inner face of the panel of the closure or it may be applied over only part of the inner face. In particular, when the panel includes one or more push or pull components defined in the panel by discontinuities or lines of weakness the composition may be applied primarily to cover just the discontinuity or line of weakness.

For instance one type of closure, usually a can end, includes at least one, and often two, push components that are defined by partial score lines through the metal panel such that finger pressure can push a circular area of the panel into the container, so as to allow access to the contents of the container. Thus there may be a small push component to allow release of pressure and a larger push component to allow pouring of liquid from the container. Such a system is described in, for instance, DE 3,639,426. In particular, the composition of the first embodiment of the present invention may be deposited as an annulus (or a disc) covering the line of weakness. The line of weakness may merely be a weakened line in the metal panel but it can be a total cut around the push component, for instance as in DE 3,639,426, in which event the push component generally has an area slightly larger than the opening in the panel that is defined by the cut line and the composition of the invention can then form a seal between the push component and the remainder of the panel of the closure.

In all instances where push or pull components are to be formed within a metal panel, there is a serious risk that the formation of the push or pull components may damage the polymeric lacquer coating that is generally present on the inner surface of the metal panel. This can expose the metal to corrosion. Application of a composition of the present invention to a container as described herein can both inhibit corrosion of the metal container as well as improve storage stability of the contents of the container, especially water bearing contents, such as beer.

In addition to use in metal, glass and plastic containers, the compositions can be used in a cardboard or laminated container such as a juice box. Such a container is a cardboard carton or tube with an interior liner. The composition can be placed in or layered with the interior liner of the cardboard package, along a line of weakness at the package closure, or at any other convenient location in the package. Alternately, the present composition can be placed within the container as a film, mat or sachet.

Further, the composition of the first embodiment can be compounded and extruded into desired shapes when the polymer matrix is a thermoplastic resin. For example, the subject compositions can be formed into films per se or as a component of a film composition used to prepare flexible packaging, such as bags, or the films can be laminated onto metal stock which can then be formed into cans and closures. Also, the compositions may be included in flexible packaging such as multilayer films or laminates or as a ribbon, patch, label or coating on a thermoplastic bag or lidstock. When the subject composition is part of a multilayer film, the layer formed of the present composition should be the surface layer which will be exposed to the inner surface of the resultant flexible package or should be an inner layer which is covered by a surface layer having high porosity to permit the $O_2$ and moisture to penetrate into and contact the layer containing the present composition. Thus, the term "exposed to the interior", as used herein and in the appended claims shall mean either direct or indirect exposure of the subject composition to the inner atmosphere of a sealed container having material contained therein.

The compositions can also be used in conjunction with or as a portion of a tamper-evident membrane for pharmaceuticals and foods.

The following examples are given for illustrative purposes only and are not meant to be limiting or limiting the claims which are appended hereto. All parts and percentages are by weight unless otherwise indicated.

EXAMPLE 1

A solution of 11.14 g $CUSO_4.5H_2O$ in approximately 500 ml of deionized water was prepared. Approximately 21 g of Zeolite Y (USY zeolite, a steam-treated zeolite which exhibits improved stability, from Davison division of W. R. Grace & Co.—Conn., Baltimore, Md.) was added and slurried with the $CUSO_4$ solution overnight. The zeolite was isolated by filtration, washed several times with deionized water, and dried, yielding a pale blue powder. Inductively coupled plasma ("ICP") analysis indicated a copper loading of approximately 3%.

The $Cu^{2+}$ exchanged zeolite powder was reduced by hydrogenation at 300° C. in the presence of approximately 100 psi of $H_2$. After 24 hours, a dark purple $Cu^0$ exchanged zeolite powder was obtained.

The headspace oxygen scavenging properties of the $Cu^0$ exchanged zeolite powder were tested by heat sealing samples of the powder in a plastic pouch (oxygen barrier bag BDF 2001, oxygen transmission rate approximately 5 cc $O_2/m^2$film/d/atm $O_2$ available from the Cryovac division of W. R. Grace & Co.—Conn., Duncan, S.C.). Samples of the headspace gases were removed periodically from the pouches via syringe, through adhesive backed septa attached to the pouches. The oxygen concentration in the headspace samples were measured by injecting the samples into a MOCON LC-700F oxygen analyzer available from Modern Controls, Inc., Minneapolis, Minnesota. $Cu^0$ exchanged zeolite samples were tested in ambient air, as well as in the presence of 1 ml water. The results are shown in FIG. 1.

FIG. 1 shows that the $Cu^0$ exchanged zeolite oxidizes rapidly at room temperature, and that the oxidation of the copper is enhanced by the presence of higher humidity.

EXAMPLE 2

An iron exchanged zeolite was prepared as in Example 1, except that 9.6 g of $FeCl_3.6H_2O$ was substituted for $CuSO_4.5H_2O$, and dissolved in approximately 400 ml of deionized water. The solution was adjusted to a pH of 5 using KOH. Approximately 32 g of Zeolite Y (USY zeolite, Davison) was added, and slurried in the $Fe^{3+}$ solution for 2 days. The yellow-brown $Fe^{3+}$-exchanged zeolite was isolated as in Example 1. ICP analysis indicated an iron loading of 3.8%.

The $Fe^{3+}$ exchanged zeolite powder was reduced by hydrogenation at 300° C. in the presence of 800 psi of H2 for 3 weeks. A silvery gray powder was obtained.

Figure 2:
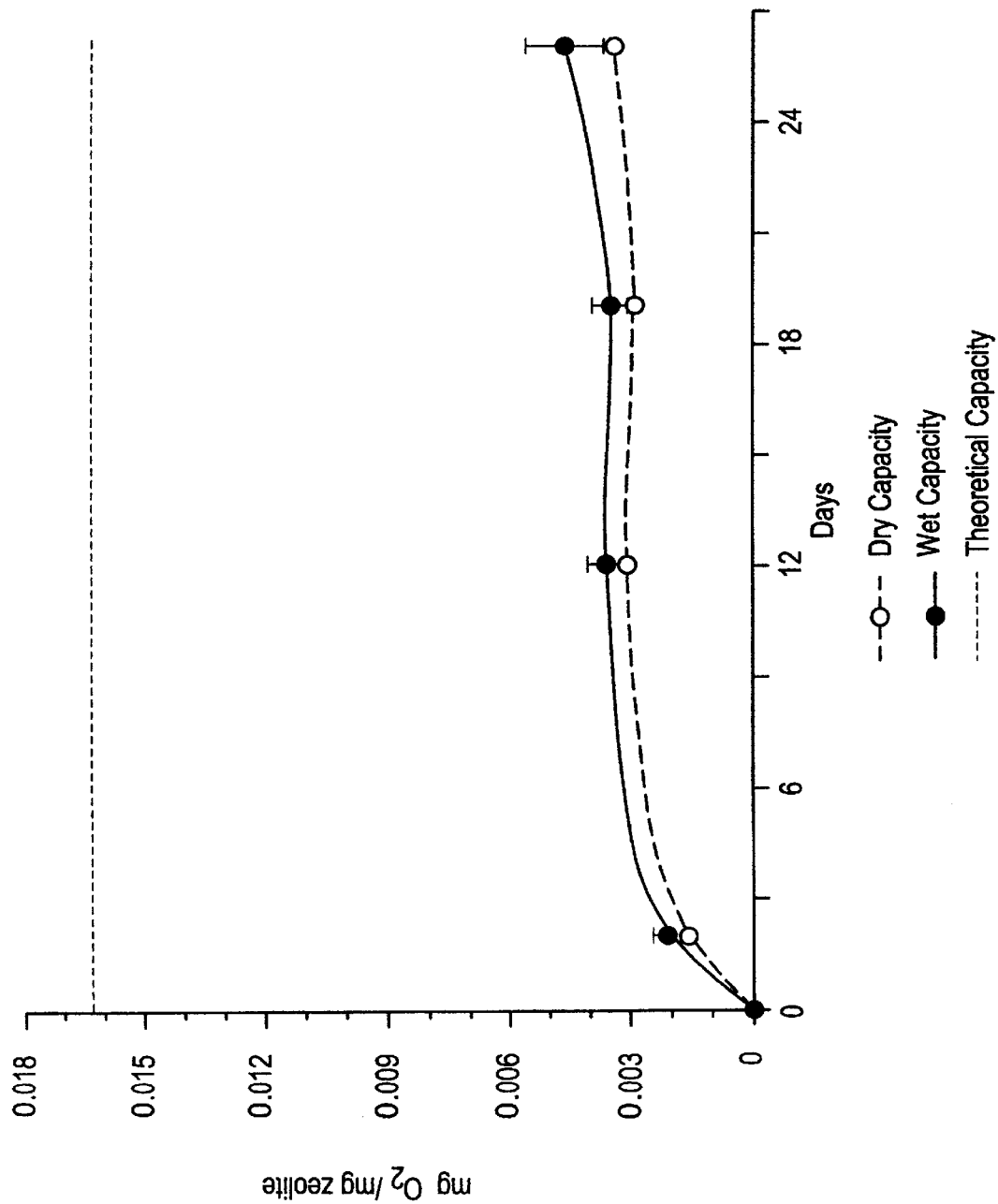
FIG. 2 is a graph of the test results of Example 2, using an inorganic exchange material having iron loading of 3.8 weight percent.

The headspace oxygen scavenging properties of the $Fe^0$ exchanged zeolite powder were tested as in Example 1. The results are shown in FIG. 2.

The results show that the $Fe^0$ exchanged zeolite scavenges rapidly at room temperature, but not as rapidly as the copper exchanged zeolite.

EXAMPLE 3

A $Cu^{2+}$ exchanged zeolite powder was prepared as in Example 1, except that approximately 100 g of $CuSO_4.5H_2O$ was dissolved in 400 ml of deionized water. Approximately 25 g of Zeolite Y (USY zeolite, Davison) was added to form a slurry. The slurry was allowed to stir for 3 hours, before washing and isolating the $Cu^{2+}$ loaded zeolite powder, as in Example 1. The $Cu^{2+}$ exchanged zeolite powder was then reduced by hydrogenation as described in Example 1. The resulting dark purple copper exchanged zeolite contained 8.8% copper by ICP analysis.

The $Cu^0$ exchanged zeolite powder was then melt compounded into a blend of low density polyethylene ("LDPE") and ethylene/vinyl acetate ("EVA") using a Brabender® mixing chamber, in the following proportions:

10% $Cu^0$ exchanged zeolite powder,
54% LDPE
36% EVA (28% vinyl acetate)

Figure 3:
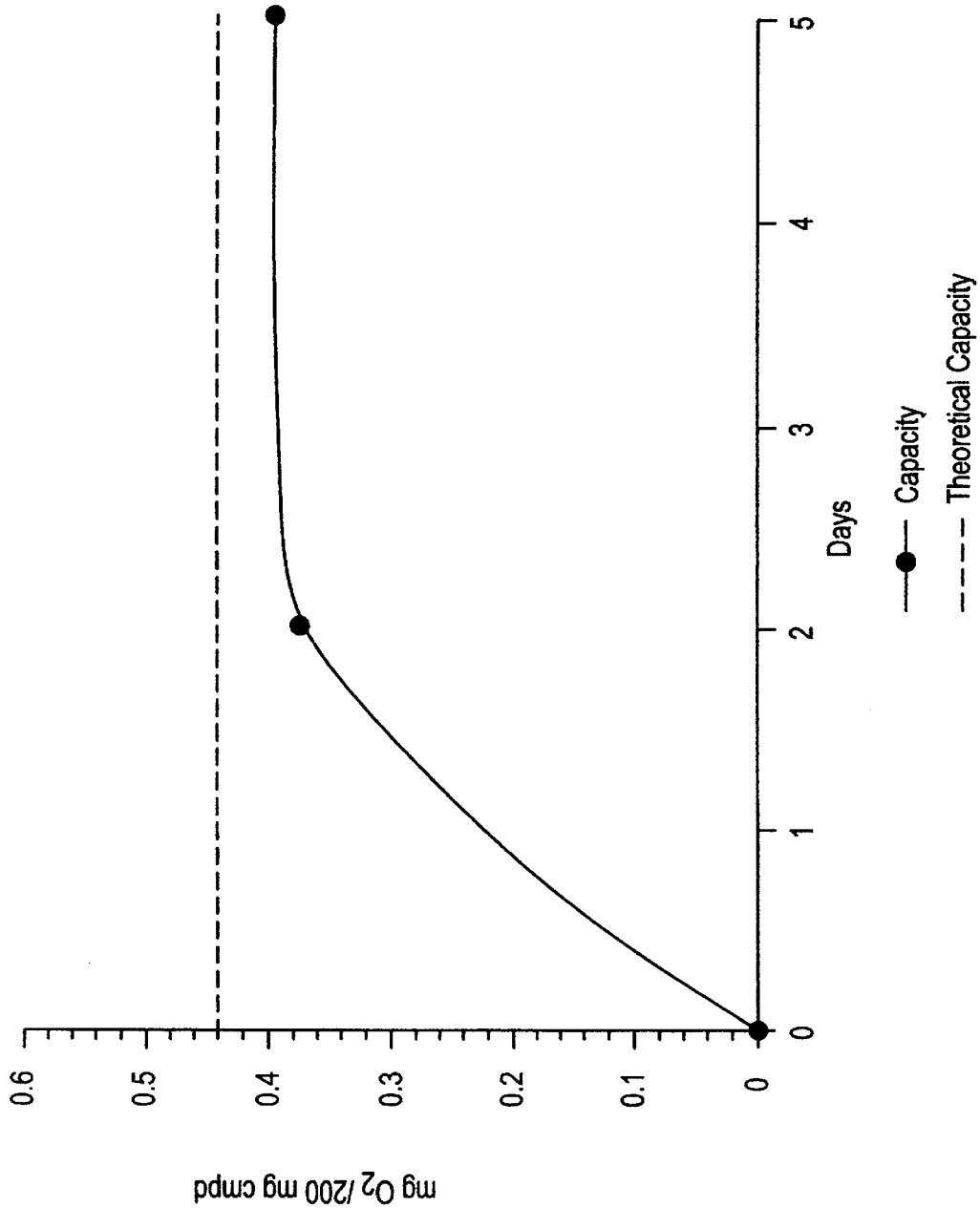
FIG. 3 is a graph of the test results of Example 3 showing an inorganic cation exchange material having a copper loading of 8.8 weight percent. 10 weight percent of the exchanged zeolite material was formulated in a low density polyethylene and ethylene/vinyl acetate blended polymeric matrix.

Films of this material were prepared using a heated hydraulic press. The films were then tested for headspace oxygen scavenging properties using the test procedure of Example 1, except that pouches were constructed of oxygen barrier film FS 6055b available from the Cryovac® Division of W. R. Grace & Co.—Conn., Duncan, S.C. (instead of BDX 2001) and contained approximately 90 ml of carbonated 3% ethanol. After inflation of the pouched with 150 ml of air (20.6% oxygen), the pouches were heated to 65° C. for 50 minutes in a convection oven. The results are shown in FIG. 3.

The results show that the $Cu^0$ exchanged zeolite scavenges oxygen rapidly at room temperature when compounded in a simulated crown liner formulation.

EXAMPLE 4

A 1.00 g sample of the $Cu^0$ exchanged zeolite (containing 8.8% $Cu^0$) was added to 250 ml of deionized water. A sample of copper powder containing the same amount of copper metal (0.0871 g) as that contained in the $Cu^0$ exchanged zeolite was also added to 250 ml of deionized water. The dissolved oxygen content and conductivity of both solutions were monitored over time. The following observations were made, and are recorded in Table 1.

TABLE 1

| | Oxygen Scavenging | | Copper Ion Concentration | | |
|---|---|---|---|---|---|
| Time Hours | $Cu^0$ ex.zeolite $O_2$ Conc. (ppm) | Copper Metal $O_2$ Conc. (ppm) | $Cu^0$ ex.zeolite $Cu^{2+}$ Conc. (ppm) | Copper Metal $Cu^{2+}$Conc. (ppm) | Notes |
| 0 | 8 | 8 | — | — | D.I. water only |
| 0 | 8 | 8 | 0 | 0 | Cu or $Cu^0$ ex. zeolite added |
| 0.5 | 0.5 | 8 | 0 | 0 | |
| 3 | 0.18 | 8 | 0 | 0 | |
| 22.5 | 0.14 | 7 | 39 | 0.3 | |

The water containing the $Cu^0$ exchanged zeolite was rapidly deoxygenated due to its rapid oxygen scavenging properties, indicating that the $Cu^0$ exchanged zeolite oxidized rapidly. However, copper powder does not scavenge oxygen rapidly, as indicated by the relatively unchanged oxygen content of the water. The oxidized $Cu^0$ exchanged zeolite released only low levels of $Cu^{2+}$ (11% of the available $Cu^{2+}$), indicating that the copper ions are substantially bound to the zeolite structure.

EXAMPLE 6

A $Mg^{2+}$ exchanged zeolite powder was prepared as in Example 1, except that approximately 147 g of $MgSO_4$ was added to 200 ml of deionized water to form a saturated solution. Approximately 25 g of Zeolite Y (USY zeolite, Davison) was added to form a slurry. The slurry was allowed to stir for approximately 18 hours, before washing and isolating the $Mg^{2+}$ exchanged zeolite powder, as in Example 1. The $Mg^{2+}$ exchanged zeolite powder was then reduced by hydrogenation as described in Example 1. The resulting magnesium exchanged zeolite contained 1.38% magnesium by ICP analysis.

Figure 4:
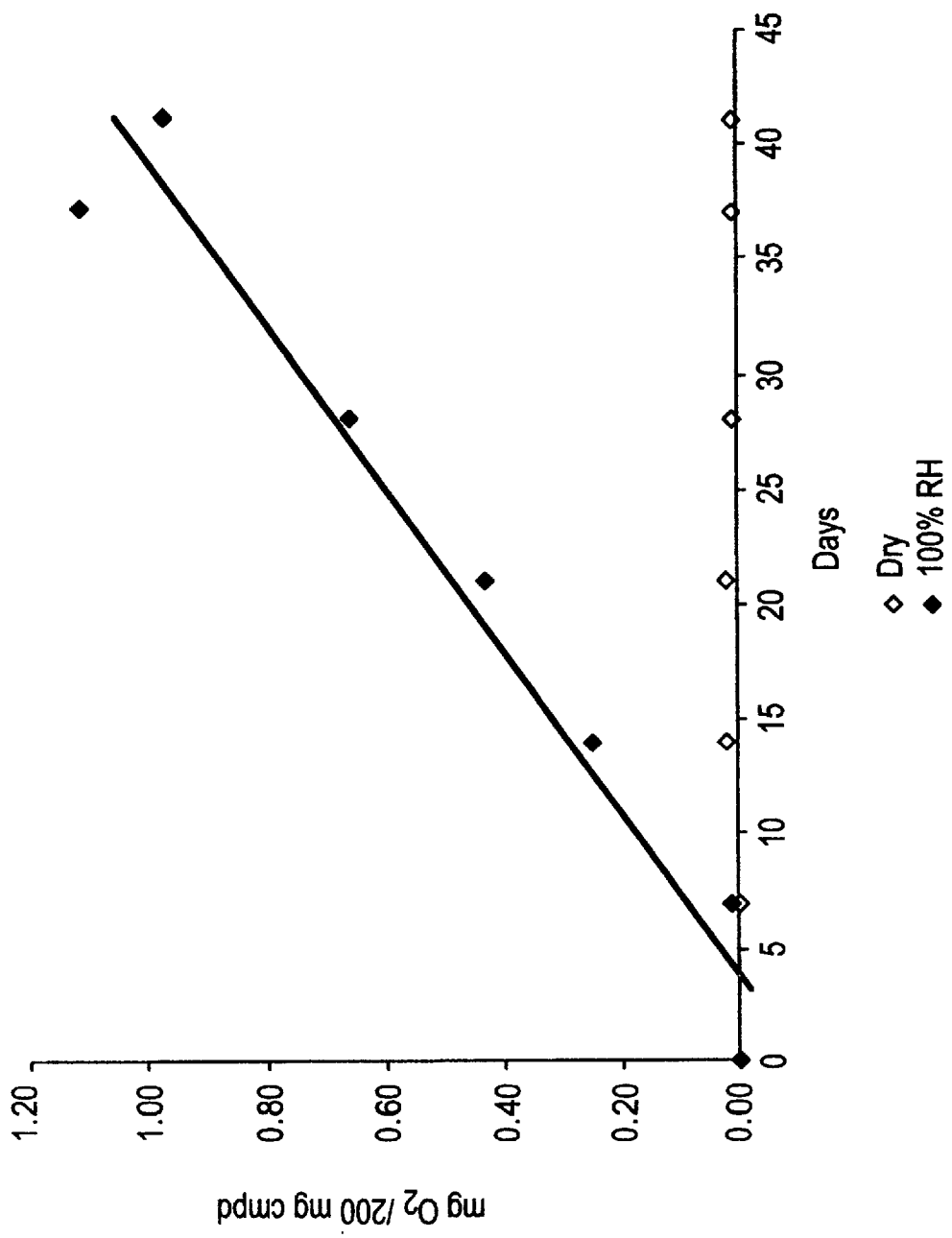
FIG. 4 is a graph of the results of Example 6, showing that the composition is storage stable under dry conditions and active under moist conditions.

The $Mg^0$ exchanged zeolite powder was then mixed into a PVC plastisol composition (Darex® CR 3692M, Grace Container Products division of W. R. Grace & Co.—Conn., Lexington, Mass.) at a level of 10% by weight. The resulting composition was coated onto aluminum foil and solidified by heating to 160° C. for 45 seconds on a hot plate. The PVC films containing the $Mg^0$ exchanged zeolite were tested for headspace oxygen scavenging properties using the test procedure of Example 3, except that the pouches contained either dry air or approximately 40 ml of water (100% RH). After inflation of the pouch with 150 ml of air (20.6% oxygen), the pouches were heated to 65° C. for 50 minutes in a convection oven. The results are shown in FIG. 4.

The results show that the $Mg^0$ exchanged zeolite scavenges oxygen rapidly at room temperature when compounded in a simulated crown liner formulation, and is activated by the presence of moisture.

EXAMPLE 7

A $Zn^{2+}$ exchanged zeolite powder was prepared in Example 1, except that approximately 150 g of $ZnSO_4.7H_2O$ was added to 200 ml of deionized water to form a saturated solution. Approximately 25 g of Zeolite Y (USY zeolite, Davison) was added to form a slurry. The slurry was allowed to stir for approximately 18 hours, before washing and isolating the $Zn^{2+}$ exchanged zeolite powder, as in Example 1. The Zn2+ exchanged zeolite powder was then reduced by hydrogenation as described in Example 1. The resulting zinc exchanged zeolite contained 3.84% zinc by ICP analysis.

Figure 5:
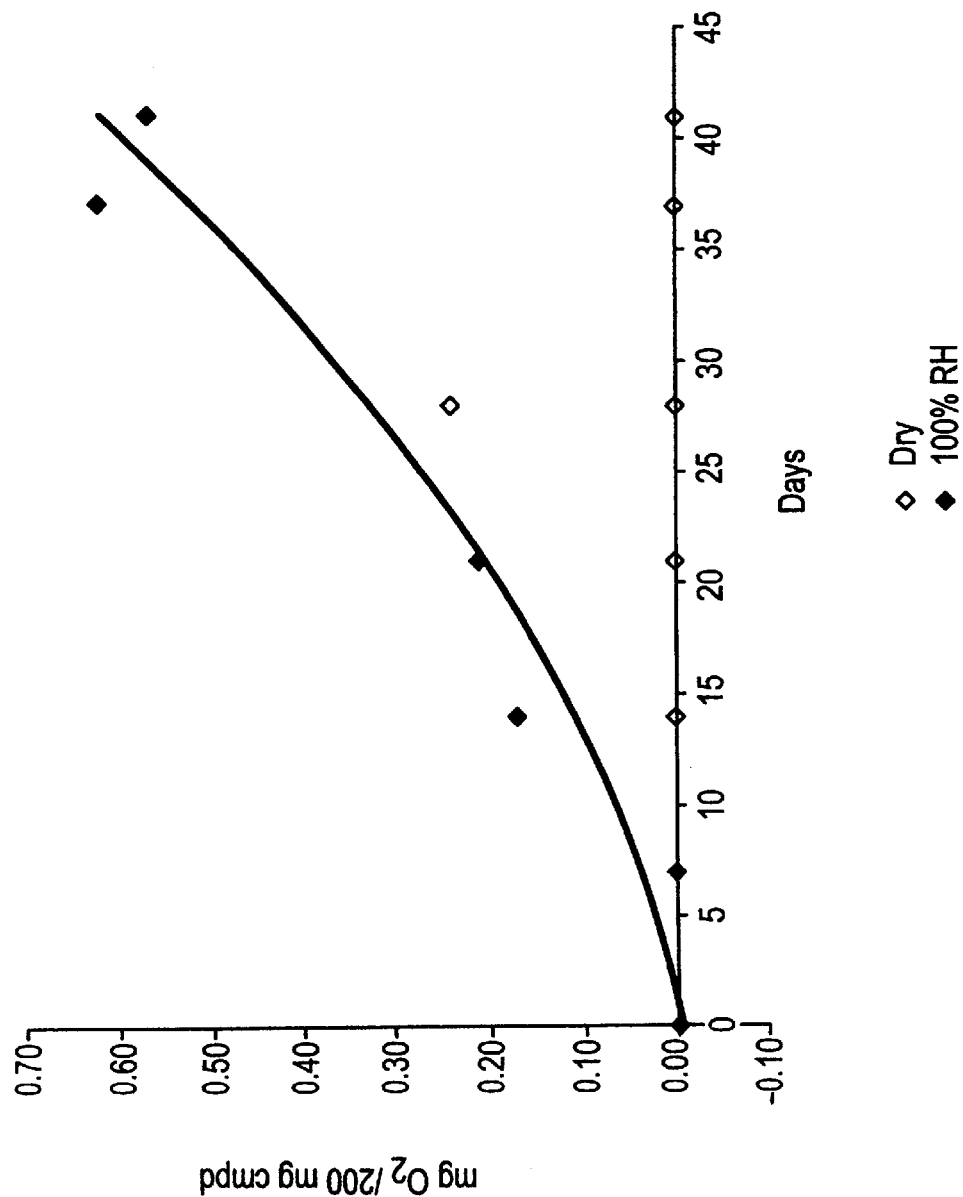
FIG. 5 is a graph of the results of Example 7, showing that the composition is storage stable under dry conditions and active under moist conditions.

The $Zn^0$ exchanged zeolite powder was then mixed into a PVC plastisol composition (Darex® CR 3692M, Grace Container Products) at a level of 10% by weight. The resulting composition was coated onto aluminum foil and solidified by heating to 160° C. for 45 seconds on a hot plate. The PVC films containing the $Zn^0$ exchanged zeolite were tested for headspace oxygen scavenging properties using the test procedure of Example 5. The results are shown in FIG. 5.

The results show that the $Zn^0$ exchanged zeolite scavenges oxygen rapidly at room temperature when compounded in a simulated crown liner formulation, and is activated by the presence of moisture.

EXAMPLE 8

A $Ni^{2+}$ exchanged zeolite powder was prepared as in Example 1, except that approximately 140 g of $NiSO_4$ was added to 200 ml of deionized water to make a saturated solution. Approximately 25 g of Zeolite Y (USY zeolite, W. R. Grace & Co.) was added to form a slurry. The slurry was allowed to stir for approximately 18 hours, before washing and isolating the $Ni^{2+}$ exchanged zeolite powder, as in Example 1. The $Ni^{2+}$ exchanged zeolite powder was then reduced by hydrogenation as described in Example 1. The resulting nickel exchanged zeolite contained 2.70% nickel by ICP analysis.

EXAMPLE 9

A $Sn^{2+}$ exchanged zeolite powder was prepared as in Example 1, except that approximately 150 g of $SnSO_4$ was added 200 ml of deionized water. Approximately 25 g of Zeolite Y (USY zeolite, W. R. Grace & Co.) was added to form a slurry. The slurry was allowed to stir for approximately 18 hours, before washing and isolating the $Sn^{2+}$ exchanged zeolite powder, as in Example 1. The $Zn^{2+}$ exchanged zeolite powder was then reduced by hydrogenation as described in Example 1. The resulting tin exchanged zeolite contained 10.3% tin by ICP analysis.

What is claimed:

1. A product that is a container having an interior cavity suitable to contain an oxygen sensitive material which has, as at least a part of said container and exposed to the interior of said container, a solid oxygen scavenging composition comprising a carrier having a metal-loaded cation exchange material wherein the metal is incorporated into said material by cation exchange of a metal ion and reduction of said metal ion to its zero-valence state.

2. The product of claim 1 wherein the cation exchange material of said metal-loaded cation exchange material is selected from the group consisting of zeolites, clays and silicas.

3. The product of claim 1 wherein the metal-loaded cation exchange material is an inorganic cation exchange material and the loaded metal is selected from the group consisting of calcium, magnesium, scandium, titanium, vanadium, chromium, manganese, iron, cobalt, nickel, copper, zinc, tin and mixtures thereof.

4. The product of claim 1 wherein the metal-loaded cation exchange material is a zeolite loaded with iron, copper, zinc, magnesium, tin, nickel and mixtures thereof.

5. The product of claim 3 wherein the metal is copper.

6. The product of claim 1, 2, 3, 4 or 5 wherein the carrier comprises a polymer matrix having at least about 0.1 weight percent cation exchange material distributed therein based on the weight of the polymer matrix.

7. The product of claims 6 wherein the polymer matrix is composed of a thermoplastic resin selected from the group consisting of polyethylene, ethylene/vinyl acetate copolymers, vinyl chlorides homopolymers and copolymers and blends thereof.

8. The product of claim 6 wherein the polymer matrix comprises a polymer selected from the group consisting of polyolefin, ethylene/vinyl acetate copolymer, butyl rubber, styrene/butadiene rubber, styrene/butadiene/styrene block copolymers, isoprene, styrenelisoprene/styrene block copolymers styrene/ethylene/butylene/styrene block copolymers, and mixtures thereof.

9. The product of claims 6 wherein the polymer matrix is one or more vinyl chloride resins.

10. The product of claims 6 wherein the polymer matrix is an elastomeric material selected from the group consisting of organic solvents and organic dispersions; and the one or more elastomeric materials is selected from the group consisting of polyolefin, butyl rubber, styrene/butadiene rubber, carboxylated styrene/butadiene, polyisoprene, styrene/ isoprenelstyrene block copolymers, styrene/butadiene/ styrene block copolymers, styrene/ethylene/butylene/ styrene block copolymers and mixtures thereof.

11. The product of claim 6 wherein the container is composed of a container body and a container closure and the solid oxygen scavenging composition is on the interior surface of the container body, is on the interior surface of the closure or is a gasket between the container body and the container closure.

12. The product of claim 1, 2, 3, 4 or 5 wherein the interior cavity of said container houses said solid oxygen scavenger composition and the carrier comprises a film having said metal loaded cationic exchange material contained on the surface of said film.

13. The product of claim 1, 2, 3, 4 or 5 wherein the interior cavity of said container houses said solid oxygen scavenger composition and the carrier comprises a mat having said metal loaded cationic exchange material contained within its void.

14. The product of claim 1, 2, 3, 4 or 5 wherein the interior cavity of said container houses said solid oxygen scavenger composition and the carrier comprises a porous pouch or sachet having metal-loaded cationic exchange material contained therein.

15. The product of claim 1, 2, 3, 4 or 5 wherein the interior cavity of said container houses said solid oxygen scavenger composition and the carrier comprises a porous inorganic ceramic material having the metal loaded cationic exchange material distributed therein.

* * * * *